UNITED STATES PATENT OFFICE.

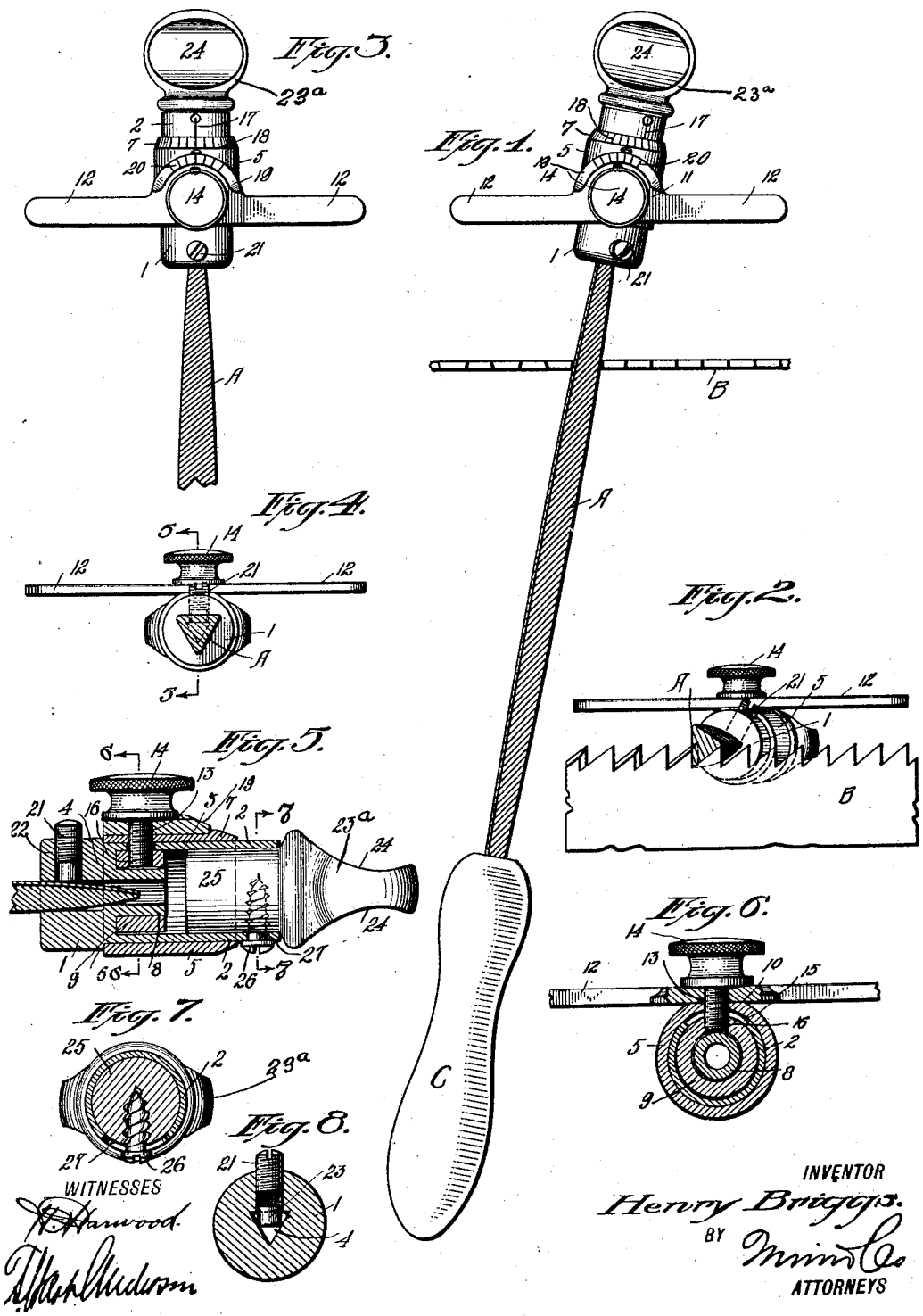

HENRY BRIGGS, OF HASBROUCK HEIGHTS, NEW JERSEY.

GUIDE OR GAUGE FOR RECIPROCATING HAND TOOLS.

1,406,924.             Specification of Letters Patent.     Patented Feb. 14, 1922.

Application filed June 12, 1920. Serial No. 388,591.

*To all whom it may concern:*

Be it known that I, HENRY BRIGGS, a citizen of the United States, and a resident of Hasbrouck Heights, county of Bergen, and State of New Jersey, have invented a new and useful Improvement in a Guide or Gauge for Reciprocating Hand Tools.

The present invention relates to a guide or gauge for hand tools, and more particularly to certain improvements on the guide or gauge as shown in Letters Patent of the United States No. 1,317,126 granted to me on the 23rd day of September, 1919.

The object of the invention is to simplify the construction of such a gauge so as to permit of its being economically manufactured, and further, to provide means whereby the operation is rendered more positive, and to provide means whereby it may be locked to the tool so as to prevent its accidental disconnection therefrom during the operation of the tool, and further to provide a handle which may be adjusted relatively to the plane of the tool forming a convenient hand-hold at the forward end of the tool assisting in its manipulation.

To the above ends the present invention consists of the devices and combinations of devices which will be hereinafter described and claimed.

Like the improved gauge of my prior patent above referred to, the gauge is shown as connected to a triangular file employed in sharpening the teeth of a saw and it is intended to indicate not only the proper angular position of the file with relation to the vertical bevel of the teeth, but also the proper angular position of the file with relation to the lateral bevel of the teeth, such position being indicated by the position of the guide arms with relation to a horizontal plane or the plane of the points of the teeth of the saw, and also with relation to the plane of the blade of the saw.

The invention is illustrated in the accompanying drawings in which—

Figure 1 shows a top plan view of the gauge applied to a triangular file and in position to operate upon the teeth of a saw, a section of which is shown in plan view.

Figure 2 is an enlarged view showing the guide or gauge in perspective and with a portion of the file and the teeth of a saw illustrating the operation of the device.

Figure 3 is a top plan view of the gauge attached to the forward end of a triangular file, a portion of which is shown, with the adjustable parts at zero.

Figure 4 is a rear elevation of the gauge showing the file in cross-section.

Figure 5 is a vertical sectional view taken on the line 5—5 in Figure 4..

Figure 6 is a vertical sectional view taken on the line 6—6 in Figure 5.

Figure 7 is a vertical sectional view taken on the line 7—7 in Figure 5.

Figure 8 is a vertical sectional view taken through the means for locking the gauge to the end of the file.

Similar reference characters will be employed throughout the specification and drawings to designate corresponding parts.

In the drawings A represents a triangular file, B the saw, and C the handle of the file which may be formed of any suitable construction.

The gauge consists of a body portion 1 which may be made of metal and cylindrical in form, provided with the extended tubular section 2 in which is formed a chamber 3.

At its axis or center the body portion 1 is provided with a triangular recess 4 which extends horizontally and axially through the body portion 1, as shown in Figure 5.

As shown in Figure 4 the triangular recess is in form an equi-lateral triangle and has one of its lines arranged horizontally and uppermost with the apex at the base whereby when the parts are at zero, the triangular file when inserted in the triangular socket 4 will have one of its surfaces uppermost and extending in a plane parallel to the guide arms 12 as indicated in Figure 4.

The tubular extension 2 of the body portion 1 receives a cylindrical sleeve 5 which, as shown in Figure 5, is shorter than the tubular extension 2 and at one end fits against a shoulder 6 formed on the body portion 1. At its opposite end sleeve 5 is preferably beveled as shown at 7.

Within the chamber 3 body portion 1 is provided with a short cylindrical projection 8, located at the center thereof and in line with the opening 4 therein. This cylindrical projection 8 receives and supports a ring 9, the ring being sufficiently large so as to permit a slight movement of the ring with relation to the projection 8 so that it may be freely turned about such projection.

The upper face of the sleeve is preferably flattened as shown at 10 forming a seat for the segmental portion 11 of the guide arm 12 which projects an equal distance beyond the segmental portion and in the plane thereof.

The segmental portion 11 is provided with an opening 13 through which passes a set screw 14, the threaded shank of which passes freely through the segmental portion 11 of the guide arm 12 and also passes through a slot 15 in the tubular extension 2 of the body portion 1 and engages a threaded opening 16 in the ring 9.

By loosening the set screw 14 the sleeve 5, guide arm 12 and ring 9 may be held and the body portion 1 turned right or left as desired, and by turning up the set screw 14 these parts are all clamped together and to the body portion 1. This provides for the axial adjustment of the file with relation to the longitudinal line of the file and permits the upper horizontal surface of the file to be positioned with relation to the plane of the guide arm 12, and when positioned so that the file is tipped to the desired extent the set screw 14 will hold the parts fixedly.

The guide arm 12 may be turned about the threaded shank of the set screw 14 so that it may be caused to extend transversely at varying angles to the longitudinal line of the file and may be held in an adjusted position by means of the set screw 14 as indicated clearly in Figures 1 and 2 of the drawings.

Preferably the upper surface of the cylindrical extension 2 will be provided with a scale mark 17, and the beveled edge 7 of the sleeve 5 with a scale 18 and the beveled edge 19 of the segmental portion 11 of the guide arm 12 will also be provided with a scale 20.

The relative adjustments are secured by turning the sleeve 5 and the guide arm 12 so as to position the respective scales with relation to the mark 17 of the extension 2, thus as indicated in Figure 1, they have been so moved with relation to the mark 17 that the file is angularly disposed not only with relation to the plane of the guide arm 12, but also with relation to a line extending parallel to the edge of the guide arm 12.

To fix the gauge or guide to the end of the file there is provided a set screw 21 which is tapped into a threaded bearing 22 in the body portion 1 and in order to protect the file a loose block or follower 23 is positioned beneath the end of the screw 21 so that it will rest upon the surface of the file and will receive the grinding action of the screw 21 upon its upper end instead of forcing the screw 21 directly in contact with the file. This will prevent all injury to the teeth of the file.

In order to provide a handle at the forward end of the file, I have provided a knob 23ª which is provided with upper and lower curved seats 24. This handle or knob 23ª is provided with a cylindrical portion 25 fitting in the chamber 3 of the cylindrical projection 2 of the body portion 1 and is held therein by means of a set screw 26 which passes through a slot 27 formed in the tubular extension 2.

By loosening the set screw 26 the knob or handle 23ª may be turned axially so as to position its concave seats with relation to the plane of the guide arm 12 or in any other position best suited to the operator, and having been positioned it is held in such position by the set screw 26.

It is thought that the operation of my improved guide or gauge will be sufficiently understood from the foregoing description and that those skilled in the art will understand that the guide arm 12 may be adjusted so as to permit the file not only to engage the saw to produce the desired vertical angle, but also to produce the desired lateral angle, and that when thus adjusted, providing the guide arm 12 is held parallel to the saw blade and also in a plane parallel to a line drawn along the points of the teeth, the desired cutting operation of the file will be produced.

Having described my invention, I claim:

1. A guide or gauge for reciprocating hand tools, comprising a body portion, a tool receiving socket in one end thereof, a cylindrical extension, a cylindrical boss within the extension, a circular clamping ring supported by the cylindrical boss, a sleeve surrounding the cylindrical extension, a guide arm seated on the sleeve and a set screw passing through the guide arm, sleeve and cylindrical extension and engaging the ring within the cylindrical extension.

2. A guide or gauge for reciprocating hand tools, comprising a body portion, a tool receiving socket in one end thereof, a cylindrical extension, a sleeve mounted on the extension, a guide arm supported on the sleeve, means to hold the parts in an assembled position, and co-operating scales carried by the cylindrical extension, sleeve and guide arm to determine the relative positions of the parts.

3. A guide or gauge for reciprocating hand tools, comprising a body portion, a tool receiving socket in one end thereof, a guide arm adjustably mounted on the body portion and adjustable in two directions with relation to the tool and means to detachably lock the tool in the socket of the body portion, said means embodying a set screw and a loosely held block or follower interposed between the bottom of the set screw and the tool.

4. A guide or gauge for reciprocating hand tools comprising a body portion, a tool receiving socket in one end thereof, a cylindrical extension, a cylindrical boss within the extension, a circular clamping ring supported by the cylindrical boss, a sleeve mounted on the extension and a guide arm supported by the sleeve and adjustable in two directions with relation to the tool about a center at right angles to the axis of the body portion.

5. A guide or gauge for reciprocating hand tools comprising a body portion, a tool receiving socket in one end thereof, a cylindrical extension, a cylindrical boss within the extension, a circular clamping ring supported by the cylindrical boss, a sleeve surrounding the cylindrical extension, a guide arm seated on the sleeve, a handle fitted in said extension to turn therein, and means co-operating with said clamping ring to lock the guide arm and the handle in adjusted position.

HENRY BRIGGS.